(12) United States Patent
Kim et al.

(10) Patent No.: US 12,542,344 B2
(45) Date of Patent: Feb. 3, 2026

(54) CLAMPING APPARATUS FOR ANTENNA DEVICE

(71) Applicant: KMW INC., Hwaseong-si (KR)

(72) Inventors: In Ho Kim, Yongin-si (KR); Kyo Sung Ji, Hwaseong-si (KR); Chi Back Ryu, Hwaseong-si (KR); Hee Kim, Osan-si (KR); Duk Yong Kim, Yongin-si (KR)

(73) Assignee: KMW INC., Hwaseong-si (KR)

( * ) Notice: Subject to any disclaimer, the term of this patent is extended or adjusted under 35 U.S.C. 154(b) by 0 days.

(21) Appl. No.: 18/602,144

(22) Filed: Mar. 12, 2024

(65) Prior Publication Data

US 2024/0250402 A1 Jul. 25, 2024

Related U.S. Application Data

(63) Continuation of application No. PCT/KR2022/014218, filed on Sep. 23, 2022.

(30) Foreign Application Priority Data

Sep. 24, 2021 (KR) .................. 10-2021-0126742
Sep. 22, 2022 (KR) .................. 10-2022-0119784

(51) Int. Cl.
*H01Q 1/12* (2006.01)
*F16B 2/08* (2006.01)
*F16M 13/02* (2006.01)

(52) U.S. Cl.
CPC ............. *H01Q 1/1242* (2013.01); *F16B 2/08* (2013.01); *F16M 13/022* (2013.01)

(58) Field of Classification Search
CPC ........ F16M 13/022; F16B 2/08; H01Q 1/1242
See application file for complete search history.

(56) References Cited

U.S. PATENT DOCUMENTS 1,653,083 A * 12/1927 Blaw ................. E04H 12/32
    248/541
3,241,800 A * 3/1966 Richter, III ............. F16L 3/137
    248/230.9

(Continued)

FOREIGN PATENT DOCUMENTS

EP    2309832 B1   12/2014
EP    3516733 B1   10/2020

(Continued)

OTHER PUBLICATIONS

International Search Report mailed Jan. 12, 2023 for International Application No. PCT/KR2022/014218 and its English translation.

(Continued)

*Primary Examiner* — Monica E Millner

(57) ABSTRACT

The present invention relates to a clamping apparatus for an antenna device and, particularly, to a clamping apparatus comprising: two or more clamping block bodies tightly combined to occupy a part of the outer surface of a support pole having a horizontal cross section in various shapes; and a clamping band coupled so as to pass through the two or more clamping block bodies, the clamping band coupling by fastening the two or more clamping block bodies to the outer surface of the support pole, wherein each of the two or more clamping block bodies has a detachable clamping gear plate having gear teeth which come in close contact with the outer surface of the support pole, thereby providing the advantage of enhancing general use with respect to replacement installation.

11 Claims, 11 Drawing Sheets

(56) References Cited

U.S. PATENT DOCUMENTS

| | | | | |
|---|---|---|---|---|
| 4,466,589 | A | * | 8/1984 | Leonardo .................. F16L 3/00 248/74.1 |
| 6,109,577 | A | * | 8/2000 | Dziedzic ................... G09F 7/18 248/230.8 |
| 6,378,820 | B1 | * | 4/2002 | Mooney .................. G09F 17/00 40/604 |
| 6,880,279 | B2 | * | 4/2005 | Kim .......................... G09F 7/22 40/607.14 |
| 9,200,654 | B1 | * | 12/2015 | Parduhn .................... F16B 2/08 |
| 9,853,346 | B2 | * | 12/2017 | Skrepcinski ......... H01Q 1/1228 |
| 10,588,305 | B2 | * | 3/2020 | Larkin ...................... B60R 7/08 |
| 10,679,529 | B1 | * | 6/2020 | Wicken ............... G09F 15/0037 |
| 10,774,979 | B2 | * | 9/2020 | Lombardi ............... F16M 11/24 |
| 11,326,666 | B2 | * | 5/2022 | Bell ........................ F16G 11/12 |
| 11,796,127 | B2 | * | 10/2023 | Gan ........................ F16M 11/10 |
| 11,893,908 | B2 | * | 2/2024 | Wicken ............... G09F 15/0037 |
| 2005/0029419 | A1 | * | 2/2005 | Ware ........................ H02G 3/10 248/218.4 |
| 2014/0008380 | A1 | * | 1/2014 | Zou ...................... F16M 13/022 248/219.4 |
| 2021/0135352 | A1 | * | 5/2021 | Bell ........................ H02G 3/32 |
| 2022/0263304 | A1 | | 8/2022 | Bell et al. |
| 2023/0012739 | A1 | * | 1/2023 | Udagave ............... H01Q 1/246 |

FOREIGN PATENT DOCUMENTS

| | | |
|---|---|---|
| JP | 2003-152409 A | 5/2003 |
| KR | 20-2011-0001415 U | 2/2011 |
| KR | 10-1440927 B1 | 9/2014 |
| WO | 2021-006521 A1 | 1/2021 |
| WO | 2021082559 A1 | 5/2021 |
| WO | 2021-125829 A1 | 6/2021 |

OTHER PUBLICATIONS

European Search Report mailed on Sep. 8, 2025 from the European Patent Office for European Application No. 22873195.6.

* cited by examiner

[FIG. 1]
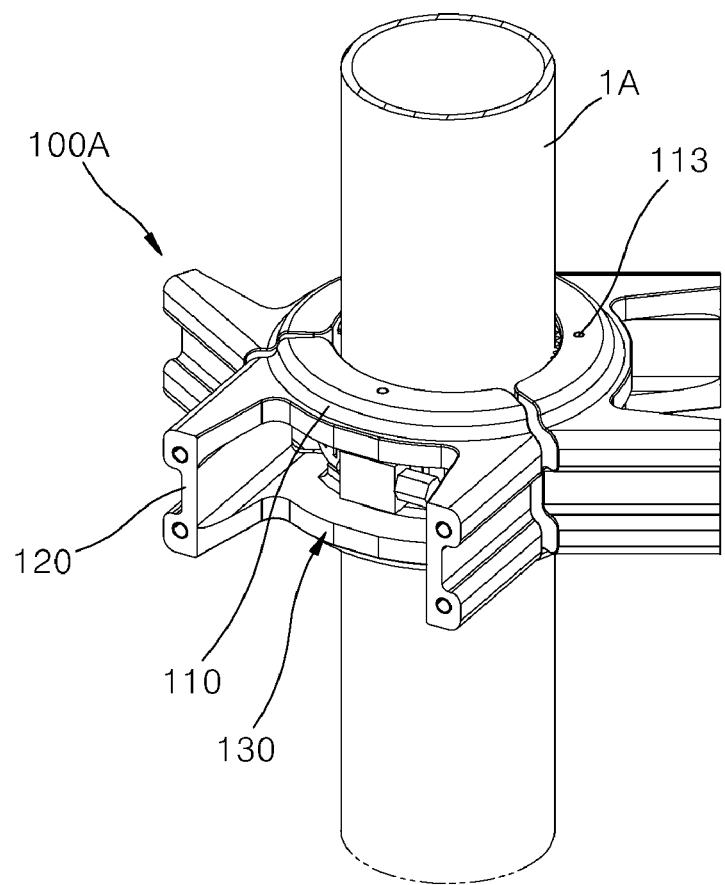

[FIG. 2]
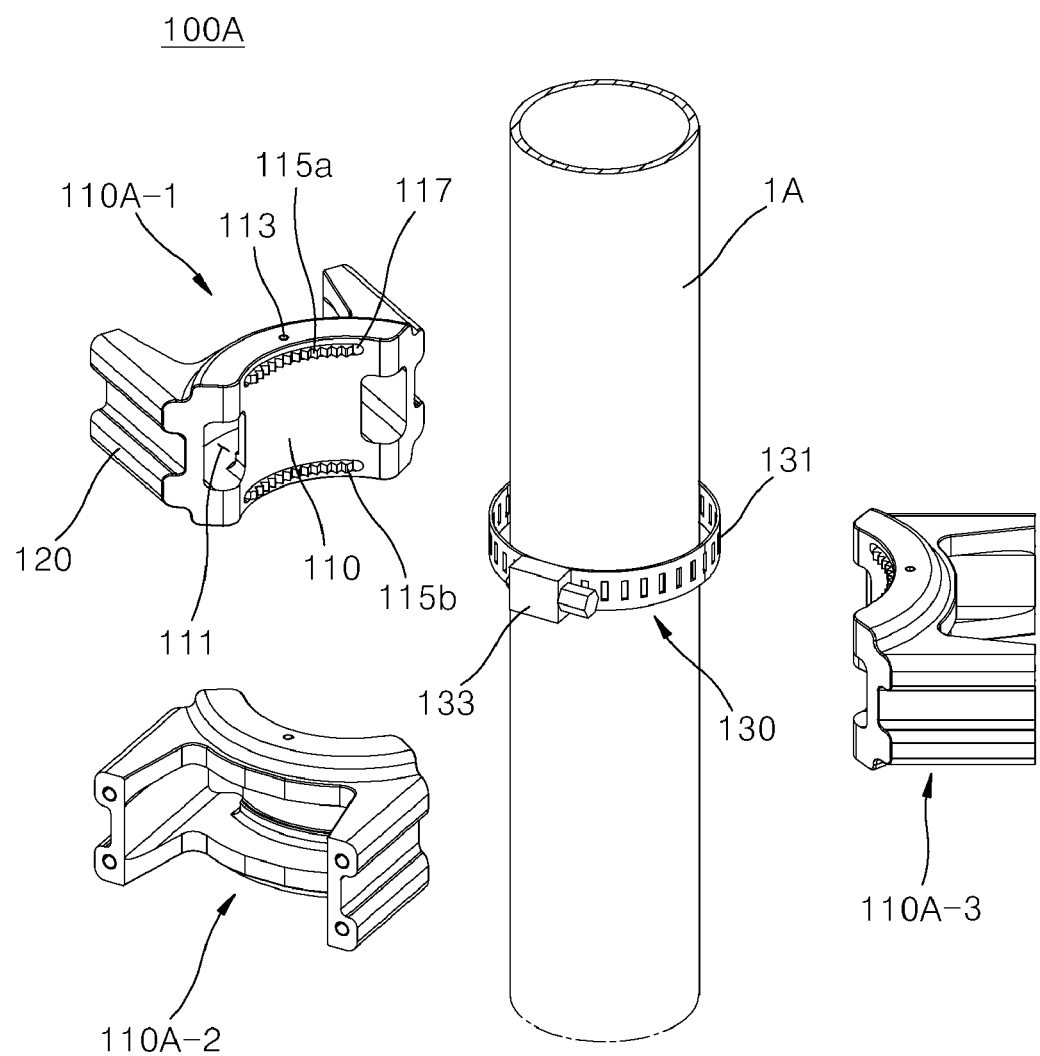

[FIG. 3]
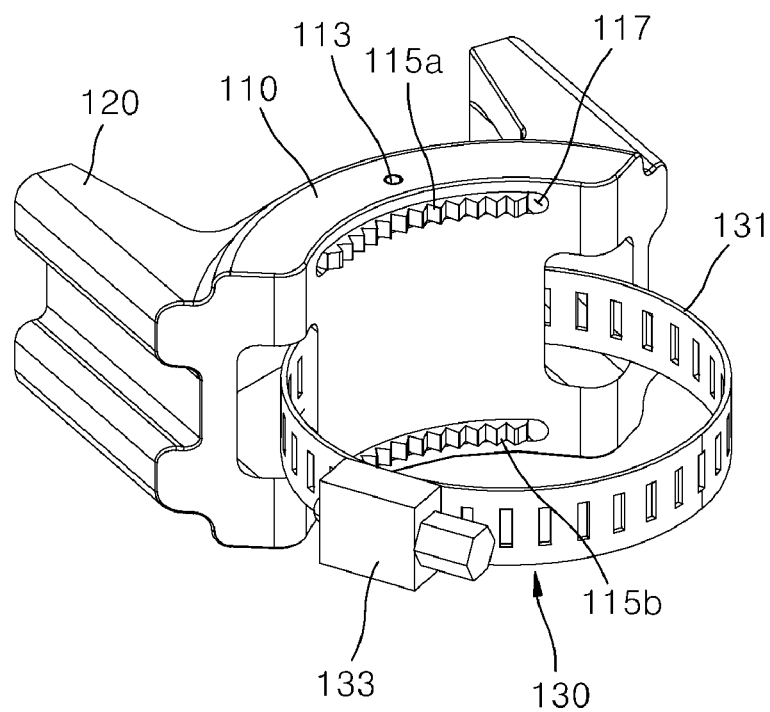

[FIG. 4]
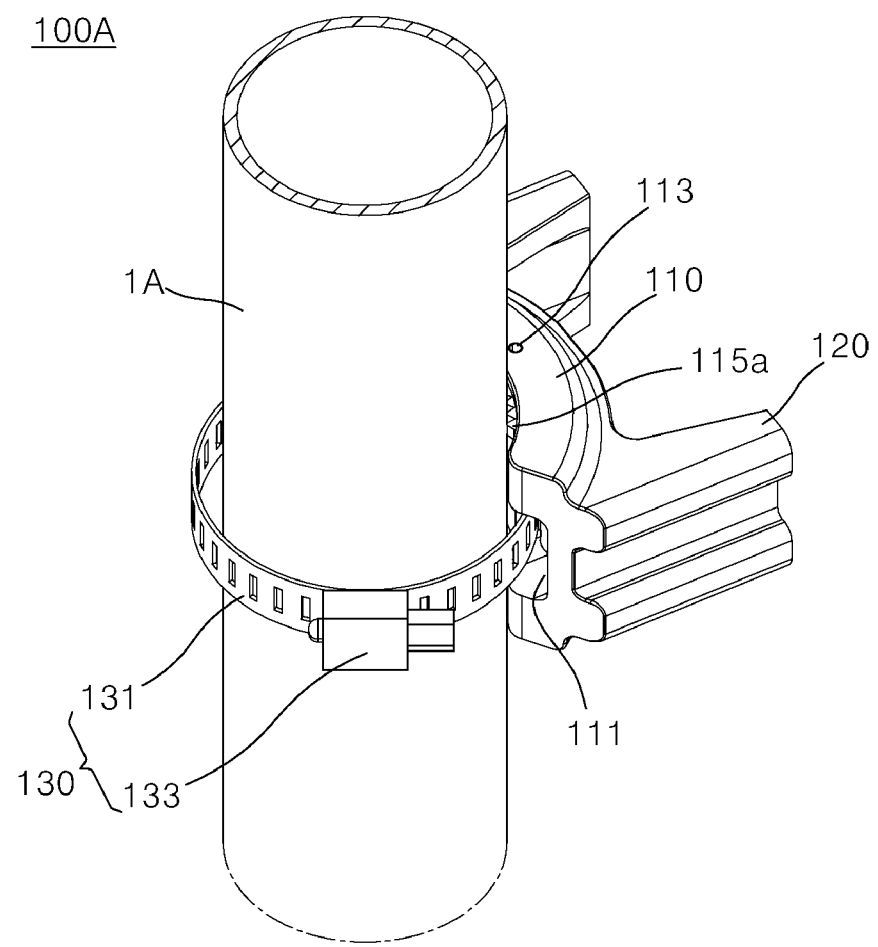

[FIG. 5]
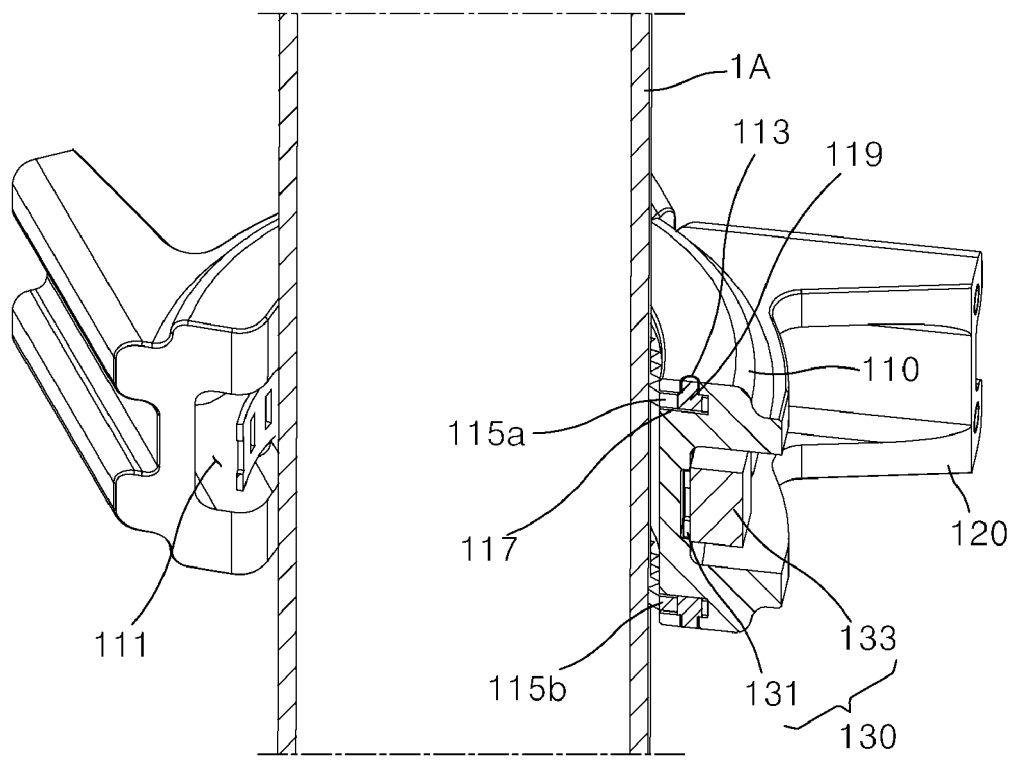

[FIG. 6]
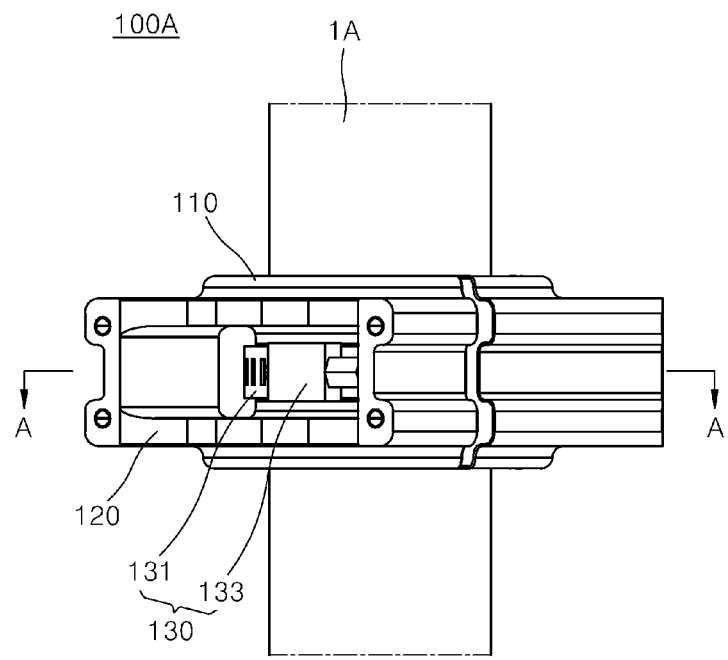
[FIG. 7]
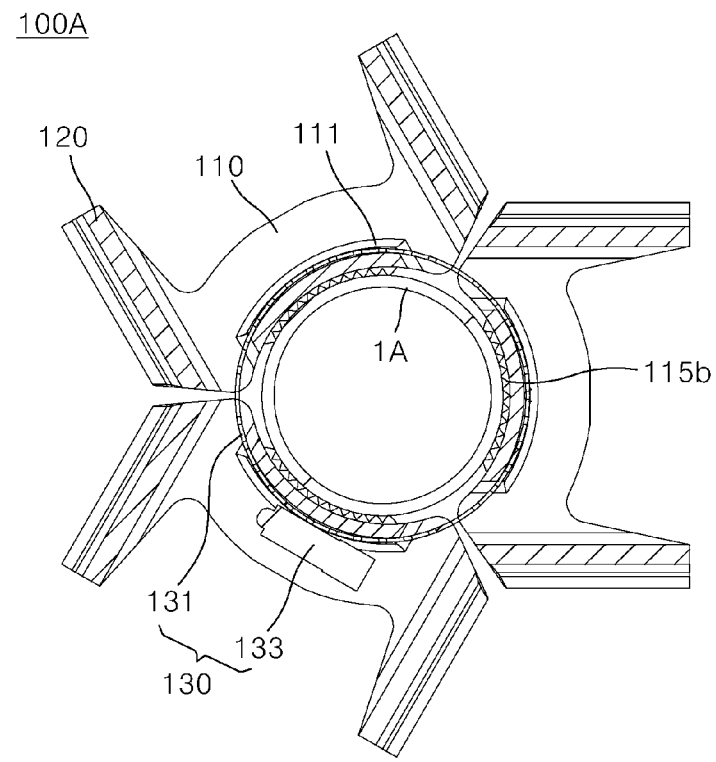

[FIG. 8A]
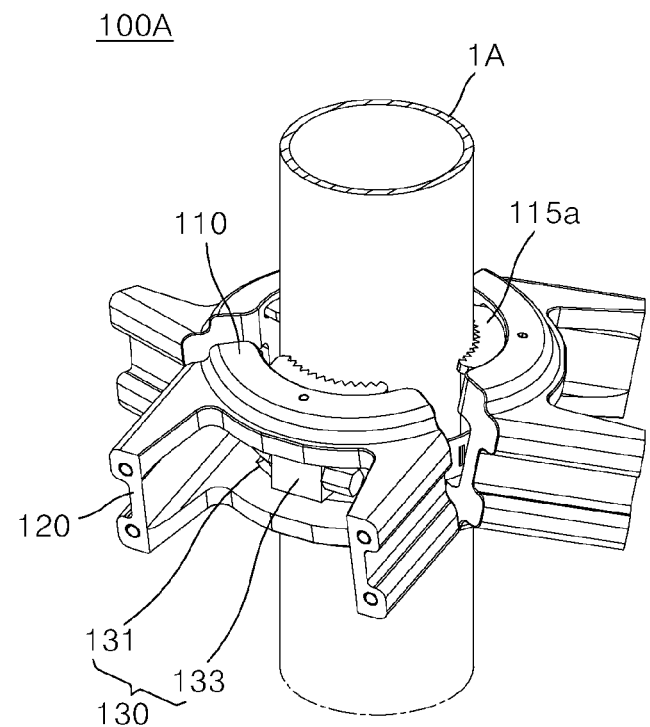
[FIG. 8B]
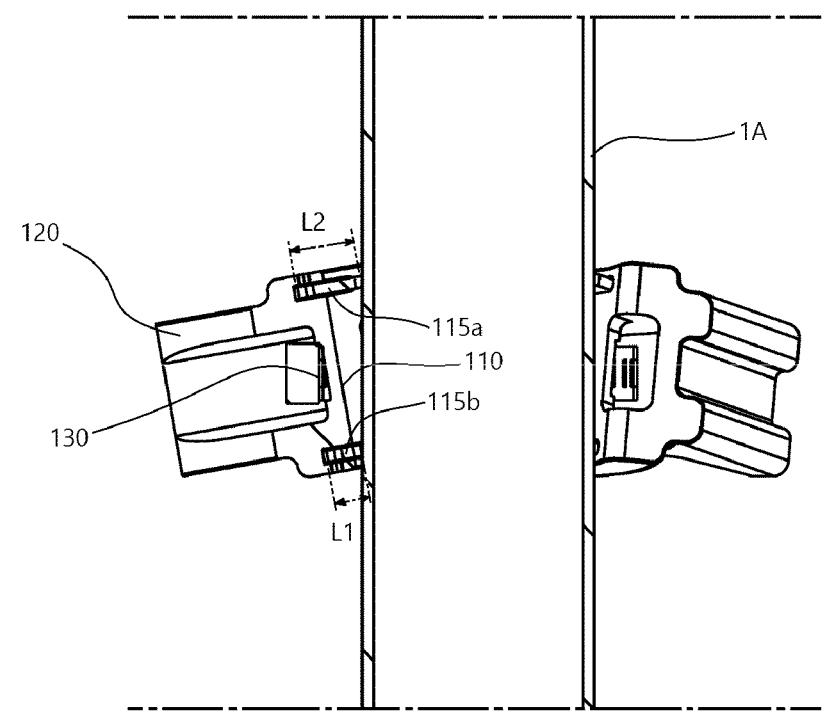

[FIG. 9]
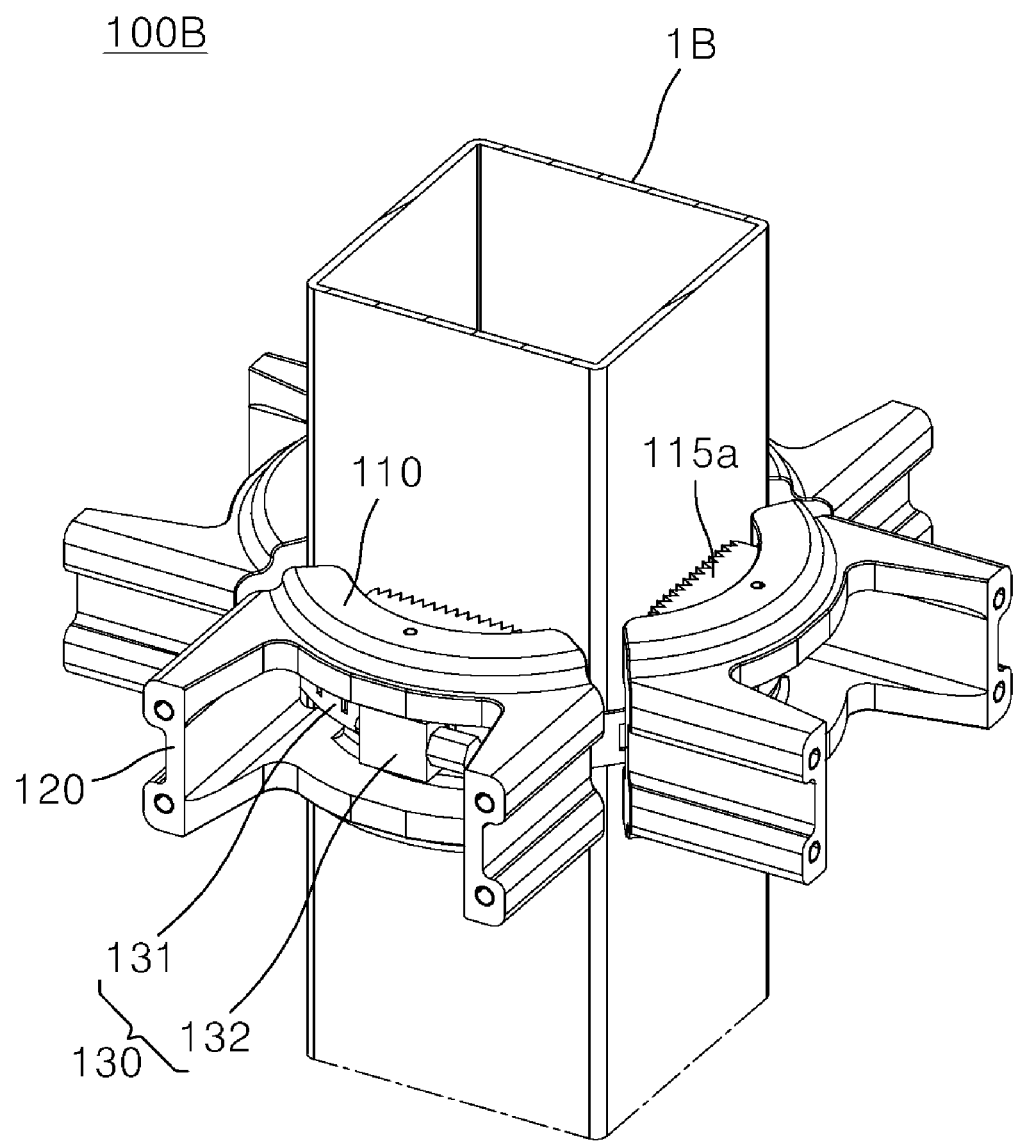

[FIG. 10]
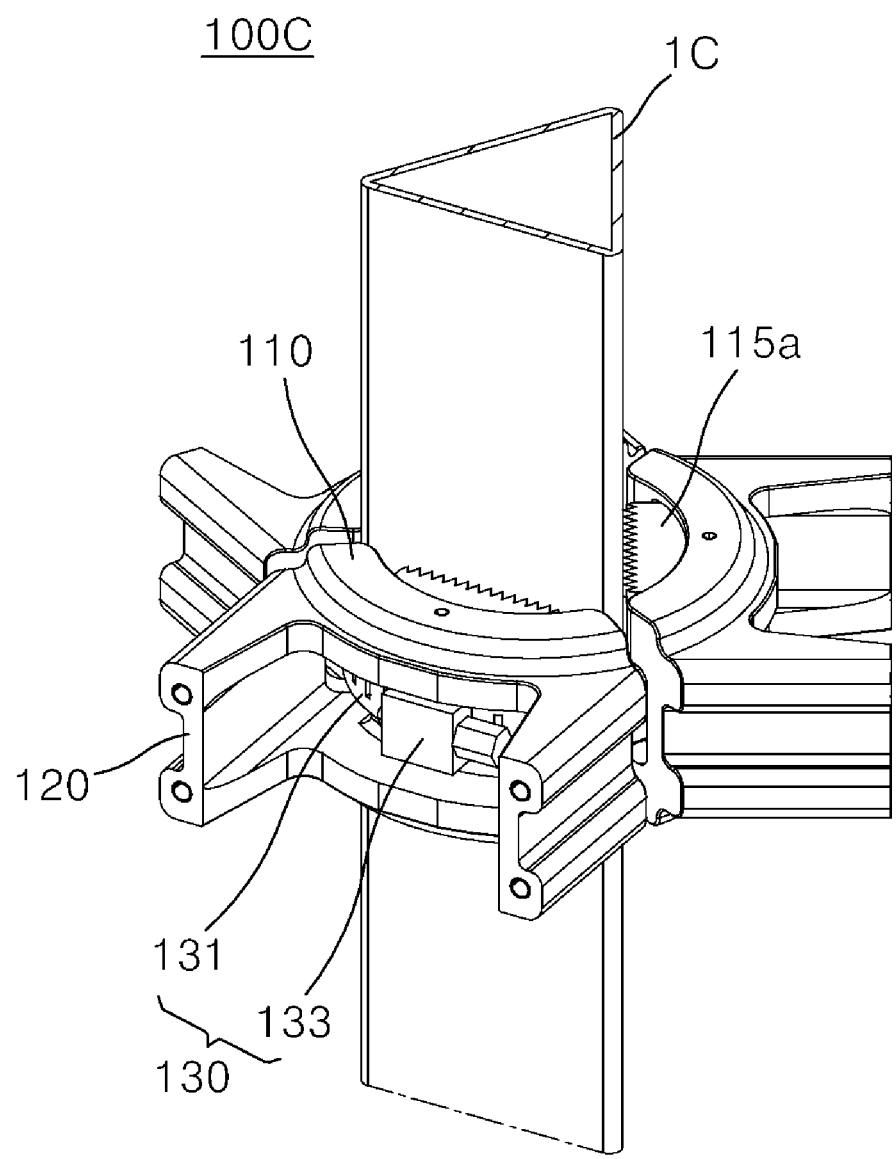

[FIG. 11]
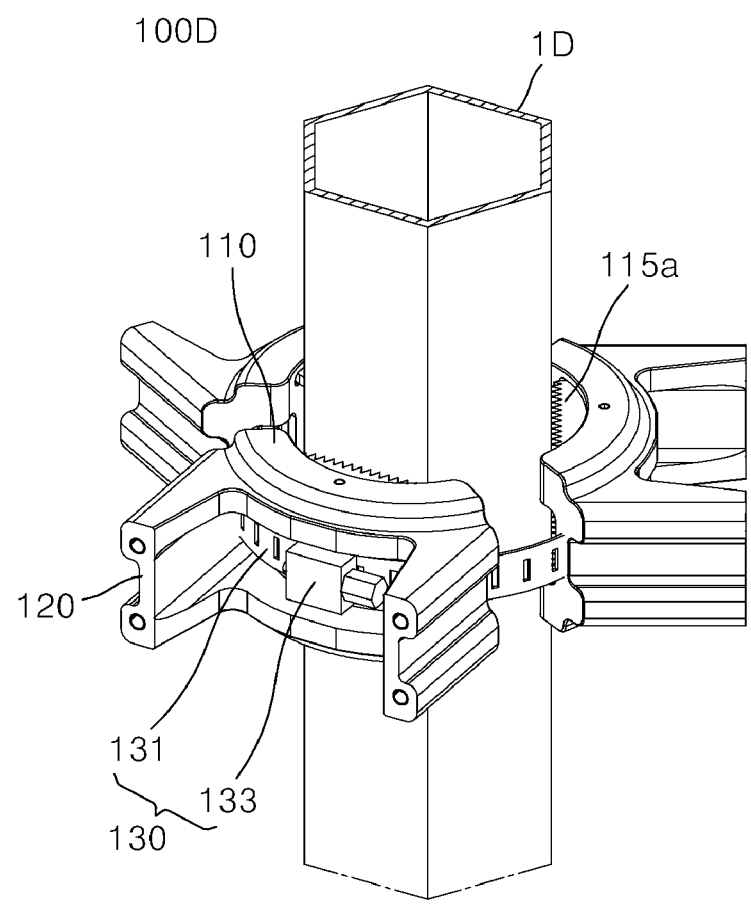

[FIG. 12]
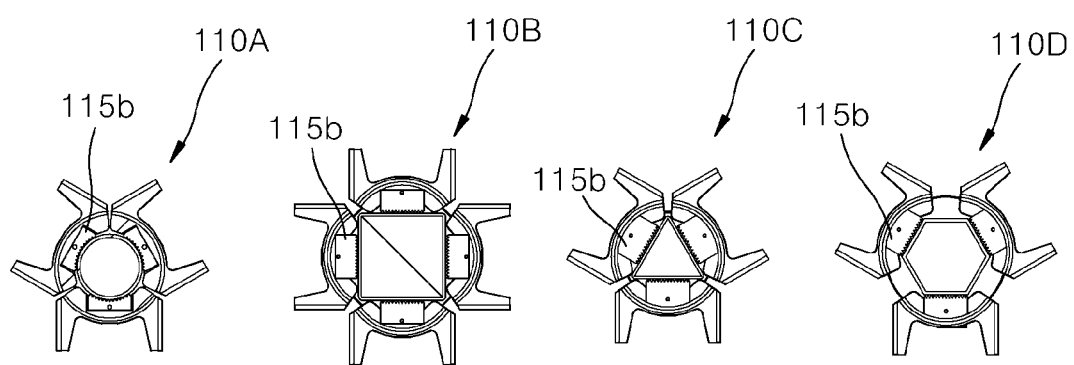
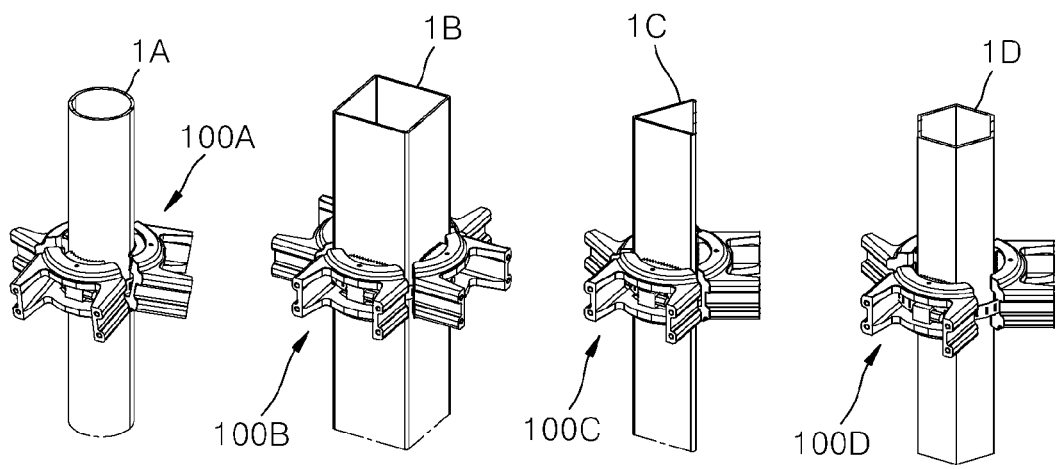
(a)  (b)  (c)  (d)

CLAMPING APPARATUS FOR ANTENNA DEVICE

CROSS-REFERENCE TO RELATED APPLICATIONS

This application is a continuation application of International Application No. PCT/KR2022/014218, filed on Sep. 23, 2022, which claims the benefit of Korean Patent Application Nos. 10-2021-0126742, filed on Sep. 24, 2021; and 10-2022-0119784, filed on Sep. 22, 2022, filed on Sep. 19, 2022, in the Korean Intellectual Property Office, the disclosures of which are incorporated herein in their entirety by reference.

TECHNICAL FIELD

The present disclosure relates to a clamping apparatus for an antenna device, and more particularly, to a clamping apparatus for an antenna device, which is provided so that two or more antenna devices are easily installed on an outer circumferential surface of a support pole including horizontal cross sections having various shapes.

BACKGROUND ART

A wireless communication technology, for example, a multiple input multiple output (MIMO) technology, is a technology for significantly increasing a data transmission capacity by using multiple antennas, and is a spatial multiplexing scheme in which a transmitter transmits different data through transmission antennas and a receiver distinguishes between transmission data through proper signal processing.

Accordingly, more data can be transmitted because a channel capacity may be increased as the numbers of transmission and reception antennas are simultaneously increased. For example, if the number of antennas is increased to 10, a channel capacity that is about 10 times compared to a current single antenna system is secured by using the same frequency band.

In 4G LTE-advanced, up to 8 antennas are used. In a current pre-5G stage, a product on which 64 or 128 antennas have been mounted is being developed. In 5G, it is expected that base station equipment having a much larger number of antennas will be used. This is called a massive MIMO technology. A current cell operation is 2-dimension. In contrast, if the massive MIMO technology is introduced, 3D-beamforming is made possible and also called full dimension (FD)-MIMO.

In the massive MIMO technology, as the number of antennas (ANT) is increased, the number of corresponding transmitters and the number of corresponding filters are also increased. Nevertheless, it is practically required to make RF parts (an antenna/filter/power amplifier/transceiver, etc.) small, light-weight, and cheap due to a lease cost for an installation place or a spatial limit of an installation place. Massive MIMO requires a high output for the extension of coverage. Consumption power and the amount of heat generated attributable to such a high output act as a negative factor in reducing a weight and a size.

In particular, when a MIMO antenna in which modules in which RF elements and digital elements have been implemented are combined as a stack structure is installed in a limited space, there is a need for the compact and small-sized design of a plurality of layers that constitute the MIMO antenna in order to maximize installation easiness or space utilization. There also emerges a need to install multiple antenna devices in one support pole. In this case, there is a need for the design of a universal clamping apparatus corresponding to a horizontal cross-sectional shape of the support pole.

DISCLOSURE

Technical Problem

The present disclosure has been contrived to solve the technical problems, and an object of the present disclosure is to provide a clamping apparatus for an antenna device in which an antenna device can be universally installed in one support pole having various horizontal cross-sectional shapes.

Furthermore, another object of the present disclosure is to provide a clamping apparatus for an antenna device, which can prevent a product from being damaged due to a downward slip phenomenon attributable to the weight of the antenna device by being closely attached to an outer surface of a support pole.

Objects of the present disclosure are not limited to the aforementioned object, and the other objects not described above may be evidently understood from the following description by those skilled in the art.

Technical Solution

A clamping apparatus for an antenna device according to an embodiment of the present disclosure includes two or more clamping block bodies each closely attached and combined to occupy a part of an outer surface of a support pole that has extended to be orthogonal to an installation surface thereof, and a clamping band configured to simultaneously penetrate the two or more clamping block bodies, wherein at least some of the clamping band closely attaches and combines the two or more clamping block bodies on the outer surface of the support pole by coming into contact with the outer surface of the support pole.

In this case, a portion of the clamping band, which corresponds to a portion between the two or more clamping block bodies, may be closely attached to the outer surface of the support pole in a tightening way.

Furthermore, the horizontal cross-sectional shape of the support pole may include any one of a circle, a triangle, a quadrangle, and a hexagon.

Furthermore, a clamping gear plate having gear teeth closely attached to the outer surface of the support pole may be detachably provided in each of the two or more clamping block bodies.

Furthermore, the two or more clamping block bodies may each include an edge block closely attached to the outer surface of the support pole and having an inner end provided with at least one horizontal installation slit for attaching and detaching and installing the clamping gear plate and a connection block in which a medium installation part that is horizontally extended from both ends of the edge block to an outside and mediates an installation of an antenna device has been extended and formed.

Furthermore, the horizontal installation slit may include two upper horizontal installation slit and lower horizontal installation slit that are spaced apart from each other up and down at an inner end of the edge block adjacent to the outer surface of the support pole.

Furthermore, the clamping gear plate may include an upper gear plate and a lower gear plate that are installed in the upper horizontal installation slit and the lower horizontal installation slit that have been formed to be spaced apart from each other up and down, respectively.

Furthermore, a gear top land that protrudes in a direction toward the outer surface of the support pole and a gear bottom land that is depressed in a direction in which the gear bottom land becomes distant from the outer surface of the support pole may be repeated and formed in the gear teeth of the clamping gear plate. A virtual line that connects front ends of the gear top lands of the gear teeth of the clamping gear plate may be formed in a shape corresponding to the outer surface of the support pole.

Furthermore, a band installation hole that has been penetrated so that the band installation hole has the center of the support pole as a concentric circle for the penetration and combination of the clamping band may be formed in the edge block.

Furthermore, the clamping band may include a band part configured to penetrate the band installation hole and to closely attach the clamping block body to the support pole upon tightening and fastening and a fixing part configured to fix the band part after generating a predetermined tightening force to the band part.

Furthermore, the clamping block body may occupy a cross section of a part of the outer surface that is formed by a horizontal cross-sectional shape of the support pole, wherein two or more clamping block bodies may be installed to be adjacent to each other or spaced apart from each other.

Furthermore, the horizontal cross-sectional shape of the support pole may include any one of a circle, a triangle, a quadrangle, and a hexagon. The remaining external shapes except an end at which the gear teeth of the clamping gear plate have been formed may have an identical shape regardless of the horizontal cross-sectional shape of the support pole.

Furthermore, a length between an outer end of the upper gear plate at which the gear teeth have been formed and an inner end of the upper gear plate, which is disposed within the horizontal installation slit, and a length between an outer end of the lower gear plate at which the gear teeth have been formed and an inner end of the lower gear plate, which is disposed within the horizontal installation slit, may be different so that the clamping block body is tilted and installed.

Advantageous Effects

According to the clamping apparatus for an antenna device according to an embodiment of the present disclosure, there is an effect in that installation versatility is improved because the clamping apparatus can be firmly installed in the support pole by replacing the clamping gear plate that is matched with a horizontal cross-sectional shape of the support pole.

DESCRIPTION OF DRAWINGS

FIG. 1 is a perspective view illustrating a clamping apparatus for an antenna device according to a first embodiment of the present disclosure, FIG. 2 is an exploded perspective view of FIG. 1, FIG. 3 is a perspective view illustrating a form in which a clamping band is installed in a unit clamping block body, among the components of FIG. 1, FIG. 4 is a perspective view illustrating an installation shape of the unit clamping block body for a support pole using a clamping band, among the components of FIG. 1, FIG. 5 is a cutaway perspective view illustrating a clamping gear plate which may be replaced and installed in the clamping block body, among the components of FIG. 1, FIG. 6 is a front view of the clamping apparatus for an antenna device according to the first embodiment of the present disclosure, FIG. 7 is a cross-sectional view taken along line A-A in FIG. 6, FIGS. 8A and 8B are a perspective view illustrating an example in which the clamping apparatus for an antenna device according to the first embodiment of the present disclosure has been differently installed and a cross-sectional view of the clamping apparatus, FIGS. 9 to 11 are perspective views in which clamping apparatuses for an antenna device according to second to fourth embodiments of the present disclosure have been mounted, and FIG. 12 is perspective views and horizontal cross-sectional views of the first to fourth embodiments of the present disclosure in FIGS. 1 and 9 to 11.

DESCRIPTION OF REFERENCE NUMERALS 1A to 1D: support pole
100A to 100D: clamping apparatus for antenna device
110, 120: clamping block body
110: edge block
111: band installation hole
113: fixing hole
115a, 115b: clamping gear plate
117: horizontal installation slit
119: fixing member
120: connection block
130: clamping band
131: band part
133: fixing part

BEST MODE

Hereinafter, clamping apparatuses for an antenna device according to embodiments of the present disclosure will be described in detail with reference to the accompanying drawings.

In adding reference numerals to the components of each drawing, it should be noted that the same components have the same reference numerals as much as possible even if they are displayed in different drawings. Furthermore, in describing embodiments of the present disclosure, when it is determined that a detailed description of the related well-known configuration or function hinders understanding of an embodiment of the present disclosure, the detailed description thereof will be omitted.

Furthermore, in describing components of an embodiment of the present disclosure, terms, such as a first, a second, A, B, (a), and (b), may be used. Such terms are used only to distinguish one component from another component, and the essence, order, or sequence of a corresponding component is not limited by the terms. All terms used herein, including technical or scientific terms, have the same meanings as those commonly understood by a person having ordinary knowledge in the art to which the present disclosure pertains, unless defined otherwise in the specification. Terms, such as those commonly used and defined in dictionaries, should be construed as having the same meanings as those in the context of a related technology, and are not construed as having ideal or excessively formal meanings unless explicitly defined otherwise in the specification.

Clamping apparatuses 100A to 100D for an antenna device according to the present disclosure each play a role as a medium that enables multiple antenna devices (not illustrated) to be stably installed at the same height with each of support poles 1A to 1D.

More specifically, the clamping apparatuses 100A to 100D for an antenna device according to the present disclosure each include a clamping block body 110 and 120 that is installed in each of the support poles 1A to 1D having various horizontal cross sections and a clamping band 130 that fixes the clamping block body 110 and 120 to each of the support poles 1A to 1D.

In this case, the clamping block body 110 and 120 may include a clamping gear plate 115a and 115b in which gear teeth that generate a friction force to an outer circumferential surface (or an outer surface) of each of the support poles 1A to 1D by a tightening force of the clamping band 130 are provided at an inner circumferential end thereof.

FIG. 1 is a perspective view illustrating a clamping apparatus for an antenna device according to a first embodiment of the present disclosure. FIG. 2 is an exploded perspective view of FIG. 1. FIG. 3 is a perspective view illustrating a form in which a clamping band is installed in a unit clamping block body, among the components of FIG. 1. FIG. 4 is a perspective view illustrating an installation shape of the unit clamping block body for a support pole using a clamping band, among the components of FIG. 1. FIG. 5 is a cutaway perspective view illustrating a clamping gear plate which may be replaced and installed in the clamping block body, among the components of FIG. 1. FIG. 6 is a front view of the clamping apparatus for an antenna device according to an embodiment of the present disclosure. FIG. 7 is a cross-sectional view taken along line A-A in FIG. 6.

The support pole 1A may be formed to have a circular horizontal cross section in the first embodiment 100A, as referred in FIGS. 1 to 7. Two or more clamping block bodies 110 and 120 may be installed in the support pole 1A.

For example, the clamping block bodies may be installed in the support pole 1A to be spaced apart from each other at an angle at which the clamping block bodies do not mutually influence beam tilting and steering operations of an antenna device. Two clamping block bodies 110 and 120 may be installed at an interval of 180 degrees or three clamping block bodies 110 and 120 may be adjacently installed in a circumferential direction thereof at intervals of 120 degrees in the support pole 1A. The first embodiment 100A of the present disclosure exemplifies that three clamping block bodies 110A-1, 110A-2, and 110A-3 have been installed on an outer circumferential surface of the support pole 1A at intervals of 120 degrees. However, four clamping block bodies may be adjacently installed at intervals of 90 degrees because two or more clamping block bodies 110 and 120 may be installed. It may be said to be natural that clamping block bodies more than the four clamping block bodies may be installed.

In this case, as referred in FIGS. 1 to 7, the clamping block body 110 and 120 may be closely attached to an outer surface of the support pole 1A, and may include an edge block 110 in which at least one horizontal installation slit 117 for the attachment and detachment and installation of a clamping gear plate 115a and 115b has been provided at an inner end of the clamping block body and a pair of connection blocks 120 that are extended in parallel from both ends of the edge block 110 to the outside horizontally and in which a medium installation part (not illustrated) that mediates the installation of an antenna device (not illustrated) has been extended and formed.

An outward appearance of the edge block 110 and the connection block 120 is formed to have a common shape and size regardless of a shape of each of the support poles 1A to 1D. As described later, only the clamping gear plate 115a and 115b may be detachably replaced and installed so that the clamping gear plate is adapted to an outward appearance (or a horizontal cross-sectional shape) of the support poles 1A to 1D. This will be described more specifically later.

Meanwhile, a separate structure for the installation and fixing of the clamping block body 110 and 120 does not need to be additionally installed in the support pole 1A, and the support pole 1A may be installed with a sufficient clamping force through only the clamping band 130.

More specifically, as referred in FIGS. 1 to 7, the clamping band 130 may include a band part 131 that penetrates and combines the clamping block body 110 and 120 and a fixing part 133 that is fixed after generating a predetermined tightening force to the band part 131.

In this case, the clamping band 130 simultaneously penetrates multiple clamping block bodies 110 and 120, but plays a role of closely combining two or more clamping block bodies 110 and 120 with the outer surface of the support pole 1A as at least some of the clamping band comes into contact with the outer surface of the support pole 1A.

A portion of the clamping band 130, which corresponds to a portion between the two or more clamping block bodies 110 and 120, may be closely attached to the outer surface of the support pole 1A in a tightening way.

A band installation hole 111 that has been penetrated to have the center of the support pole 1A as a concentric circle for the penetration and combination of the clamping band 130 may be formed in the edge block 110 in the construction of the clamping block body 110 and 120.

The band installation hole 111 may be preferably formed in a form in which the band installation hole penetrates the connection block 120 that has been extended and formed from the edge block 110. The band part 131 of the clamping band 130 may be closely attached to an outer surface of the edge block 110 and tightened and combined therewith at a predetermined tightening force.

In this case, the band installation hole 111 is formed to penetrate multiple edge blocks 110, but may be formed to penetrate the multiple edge blocks by using the center of the support pole 1A as a concentric circle.

After the band part 131 of the clamping band 130 is combined to penetrate the band installation holes 111 of two or more clamping block bodies 110 and 120 simultaneously as described above, a tightening force is generated by using the fixing part 133. Accordingly, when the clamping gear plate 115a and 115b is closely attached to the outer circumferential surface of the support pole 1A and tightens the support pole while forming a friction force, the two or more clamping block bodies 110 and 120 can be easily installed in one support pole 1A simultaneously.

Meanwhile, two horizontal installation slits 117 formed at inner ends of the edge block 110, which are portions adjacent to the outer surface of the support pole 1A, in the construction of the clamping block body 110 and 120, may be formed to be spaced apart from each other up and down. The clamping gear plate 115a and 115b may include an upper gear plate 115a and a lower gear plate 115b that are installed in the two horizontal installation slits 117, respectively, which have been formed to be spaced apart from each other up and down. In this case, the horizontal installation slit 117 that has been formed in a relatively upper part is referred to as an "upper horizontal installation slit". The horizontal installation slit 117 that has been formed in a relatively lower part is referred to as a "lower horizontal installation slit".

Furthermore, both the upper horizontal installation slit and lower horizontal installation slit 117 may be formed to have the same shape and size (including a depth) regardless of a shape of the gear teeth of the clamping gear plate 115a and 115b that are installed therein. Accordingly, although the clamping gear plate 115a and 115b is replaced and installed to have gear teeth that have been differently formed depending on the type of support poles 1A to 1D that is installed, the upper horizontal installation slit and lower horizontal installation slit 117 have the same specifications. There is an advantage in that versatility can be improved.

In this case, a fixing hole 113 for fixing the clamping gear plate 115a and 115b that has been inserted and installed in the horizontal installation slit 117 by using a predetermined fixing member 119 may be formed at the bottom of the edge block 110 in which the horizontal installation slit 117 has been formed. Furthermore, although not illustrated, a locking part that is caught by the clamping gear plate 115a and 115b inserted and installed into the edge block 110 in which the horizontal installation slit 117 has been formed and that prevents the clamping gear plate 115a and 115b from being arbitrarily moved within the horizontal installation slit 117 may be further provided within the edge block 110.

Meanwhile, in general, it is preferred that each of the clamping apparatuses 100A to 100D for an antenna device according to the present disclosure needs to be made lightweighted and manufactured by considering that an antenna device having a relatively heavy weight has to be installed in each of the support poles 1A to 1D corresponding to a high location from the ground.

For example, the clamping gear plate 115a and 115b substantially plays a role of supporting and fixing the weight of the antenna device with respect to each of the support poles 1A to 1D. Accordingly, an advantage in that an overall product can be made light-weighted by adopting a material that constitutes the edge block 110 and the connection block 120 which occupy a relatively large volume and that has a smaller weight and hardness than those of the clamping gear plate 115a and 115b can be created.

FIGS. 8A and 8B are a perspective view illustrating an example in which the clamping apparatus for an antenna device according to the first embodiment of the present disclosure has been differently installed and a cross-sectional view of the clamping apparatus.

As referred in FIGS. 8A and 8B, in the clamping apparatus for an antenna device according to the first embodiment of the present disclosure, a length between an outer end of the upper gear plate 115a at which the gear teeth have been formed and an inner end of the upper gear plate 115a, which is disposed within the horizontal installation slit 117, and a length between an outer end of the lower gear plate 115b at which the gear teeth have been formed and an inner end of the lower gear plate 115b, which is disposed within the horizontal installation slit 117, may be different so that the clamping block body 110 and 120 is tilted and installed.

More specifically, referring to FIG. 8B, in the state in which both the depths of the horizontal installation slit 117 at an upper part and lower part thereof are the same, a length "L2" of the upper gear plate 115a that is combined with the lower horizontal installation slit 117 is formed to be greater than a length "L1" of the lower gear plate 115b that is combined with the upper horizontal installation slit 117. Accordingly, an angle at which the clamping block body is naturally downward tilted can be maintained because the gear teeth of the upper gear plate 115a further protrude toward an outer circumferential surface of the support pole 1A.

For example, if the clamping block body 110 and 120 needs to be installed so that the clamping block body is gradually downward tilted toward the outside centering around the support pole 1A, the length between the inner end and outer end of the upper gear plate 115a may be designed to be greater than the length between the inner end and outer end of the lower gear plate 115b. That is, the lower gear plate 115b that is installed on the lower side of the horizontal installation slit 117 may be installed to have specifications having a length having common specifications. The length between the inner end and outer end of the upper gear plate 115a that is installed on the upper side of the horizontal installation slit 117 may be set to be greater than the length between the inner end and outer end of the lower gear plate 115b. Accordingly, the clamping block body 110 and 120 can be tilted and installed at a desired angle by a length by which the upper gear plate 115a has further protruded because the upper gear plate 115a has the length (L2>L1) by which the gear teeth of the upper gear plate more protrude toward the support pole 1A than the gear teeth of the lower gear plate 115b.

Meanwhile, a gear top land that protrudes in a direction toward the outer surface of the support pole 1A and a gear bottom land that is depressed in a direction in which the gear bottom land becomes distant from the outer surface of the support pole 1A are repeated in the gear teeth of the clamping gear plate 115a and 115b. A virtual line that connects the front ends of the gear top lands of the gear teeth of the clamping gear plate 115a and 115b may be formed in a shape corresponding to the outer surface of the support pole 1A.

A technical construction relating to such a shape of the clamping gear plate 115a and 115b may also be applied to second to fourth embodiments 100B to 100D described later without any change.

FIGS. 9 to 11 are perspective views in which clamping apparatuses for an antenna device according to the second to fourth embodiments of the present disclosure have been mounted.

Referring to FIG. 9, as the second embodiment 100B, four clamping block bodies 110 and 120 may be adjacently installed on respective outer surfaces of an outer circumferential surface of the support pole 1B, which has a quadrangle horizontal cross-sectional shape.

In this case, it is preferred that the gear teeth of the clamping gear plate 115a and 115b are formed in a shape that is matched with the support pole 1B having the outer surfaces each having a flat shape.

Meanwhile, referring to FIG. 10, as the third embodiment 100C, three clamping block bodies 110 and 120 may be adjacently installed on respective outer surfaces of an outer circumferential surface of the support pole 1C, which has a triangular horizontal cross-sectional shape.

In this case, it is preferred that the gear teeth of the clamping gear plate 115a and 115b are formed in a shape that is matched with the support pole 1C having the outer surfaces each having a flat shape.

Furthermore, referring to FIG. 11, as the fourth embodiment 100D, three clamping block bodies 110 and 120 may be installed on three outer surfaces that are spaced apart from each other, respectively, among the outer surfaces of an outer circumferential surface of the support pole 1D, which has a hexagonal horizontal cross section.

Even in this case, likewise, the gear teeth of the clamping gear plate 115a and 115b may be formed in a shape that is matched with the support pole 1D having the outer surfaces each having a flat shape.

FIG. 12 is perspective views and horizontal cross-sectional views of the first to fourth embodiments of the present disclosure in FIGS. 1 and 9 to 11.

Referring to FIG. 12, both the size and specifications of the horizontal installation slit 117 that has been formed at an inner end of the edge block 110 in the construction of the clamping block body 110 and 120 are the same. In contrast, only the clamping gear plate 115a and 115b having the gear teeth, which is matched with the horizontal cross-sectional shape of the support poles 1A to 1D may be replaced and installed. Accordingly, there is provided an advantage in that the versatility of replacement and installation can be improved.

The clamping apparatus for an antenna device according to the embodiments of the present disclosure has been described in detail with reference to the accompanying drawings. However, an embodiment of the present disclosure is not essentially limited to the aforementioned embodiment, and may include various modifications and implementations within an equivalent range thereof by a person having ordinary knowledge in the art to which the present disclosure pertains. Accordingly, the true range of a right of the present disclosure will be said to be defined by the appended claims.

INDUSTRIAL APPLICABILITY

The present disclosure provides the clamping apparatus for an antenna device, by which an antenna device can be universally installed on one support pole having various horizontal cross-sectional shapes and which can prevent a product from being damaged due to a downward slip phenomenon attributable to the weight of the antenna device by being closely attached to the outer surface of the support pole.

The invention claimed is:

1. A clamping apparatus for an antenna device, comprising:
   two or more clamping block bodies each closely attached and combined to occupy some of an outer surface of a support pole that has extended to be orthogonal to an installation surface thereof; and
   a clamping band configured to simultaneously penetrate the two or more clamping block bodies, wherein at least some of the clamping band closely attaches and combines the two or more clamping block bodies on the outer surface of the support pole by coming into contact with the outer surface of the support pole,
   wherein a clamping gear plate having gear teeth closely attached to the outer surface of the support pole is detachably provided in each of the two or more clamping block bodies,
   wherein the two or more clamping block bodies each comprise:
   an edge block closely attached to the outer surface of the support pole and having an inner end provided with at least one horizontal installation slit for attaching and detaching and installing the clamping gear plate; and
   a connection block in which a medium installation part that is horizontally extended from both ends of the edge block to an outside and mediates an installation of an antenna device has been extended and formed.

2. The clamping apparatus of claim 1, wherein a portion of the clamping band, which corresponds to a portion between the two or more clamping block bodies, is closely attached to the outer surface of the support pole in a tightening way.

3. The clamping apparatus of claim 1, wherein the horizontal cross-sectional shape of the support pole comprises any one of a circle, a triangle, a quadrangle, and a hexagon.

4. The clamping apparatus of claim 1, wherein the horizontal installation slit comprises two upper horizontal installation slit and lower horizontal installation slit that are spaced apart from each other up and down at an inner end of the edge block adjacent to the outer surface of the support pole.

5. The clamping apparatus of claim 4, wherein the clamping gear plate comprises an upper gear plate and a lower gear plate that are installed in the upper horizontal installation slit and the lower horizontal installation slit that have been formed to be spaced apart from each other up and down, respectively.

6. A clamping apparatus for an antenna device, comprising:
   two or more clamping block bodies each closely attached and combined to occupy some of an outer surface of a support pole that has extended to be orthogonal to an installation surface thereof; and
   a clamping band configured to simultaneously penetrate the two or more clamping block bodies, wherein at least some of the clamping band closely attaches and combines the two or more clamping block bodies on the outer surface of the support pole by coming into contact with the outer surface of the support pole,
   wherein a clamping gear plate having gear teeth closely attached to the outer surface of the support pole is detachably provided in each of the two or more clamping block bodies,
   wherein:
   a gear top land that protrudes in a direction toward the outer surface of the support pole and a gear bottom land that is depressed in a direction in which the gear bottom land becomes distant from the outer surface of the support pole are repeated and formed in the gear teeth of the clamping gear plate, and
   a virtual line that connects front ends of the gear top lands of the gear teeth of the clamping gear plate is formed in a shape corresponding to the outer surface of the support pole.

7. The clamping apparatus of claim 2, wherein a band installation hole that has been penetrated so that the band installation hole has a center of the support pole as a concentric circle for a penetration and combination of the clamping band is formed in the edge block.

8. The clamping apparatus of claim 7, wherein the clamping band comprises:
   a band part configured to penetrate the band installation hole and to closely attach the clamping block body to the support pole upon tightening and fastening; and
   a fixing part configured to fix the band part after generating a predetermined tightening force to the band part.

9. The clamping apparatus of claim 1, wherein the clamping block body occupies a cross section of a part of the outer surface that is formed by a horizontal cross-sectional shape of the support pole, wherein two or more clamping block bodies are installed to be adjacent to each other or spaced apart from each other.

10. The clamping apparatus of claim 1, wherein:
the horizontal cross-sectional shape of the support pole comprises any one of a circle, a triangle, a quadrangle, and a hexagon, and
the clamping gear plate comprises a standardized mounting portion and a contact portion having gear teeth, wherein the mounting portion maintains identical dimensions and configuration regardless of the support pole shape, while the contact portion is adaptable to conform to the specific horizontal cross-sectional shape of the support pole.

11. The clamping apparatus of claim 5, wherein a length between an outer end of the upper gear plate at which the gear teeth have been formed and an inner end of the upper gear plate, which is disposed within the horizontal installation slit, and a length between an outer end of the lower gear plate at which the gear teeth have been formed and an inner end of the lower gear plate, which is disposed within the horizontal installation slit, are different so that the clamping block body is tilted and installed.

* * * * *